United States Patent [19]

Bosotti et al.

[11] Patent Number: 5,233,790
[45] Date of Patent: Aug. 10, 1993

[54] MOTOR VEHICLE BODY HAVING HINGED BODY PANEL ASSEMBLY INCLUDING ELEMENTS DESIGNED FOR MODIFICATION DURING INSTALLATION OF ASSEMBLY ON BODY, FOR ACHIEVING DESIRED FIT

[75] Inventors: Giovanni Bosotti, Nerviano; Carmelo Benedetto, Milan, both of Italy

[73] Assignee: Fiat Auto S.p.A., Turin, Italy

[21] Appl. No.: 771,972

[22] Filed: Oct. 9, 1991

[30] Foreign Application Priority Data

Oct. 9, 1990 [IT] Italy ................................ 21683 A/90

[51] Int. Cl.⁵ .............................................. B06J 5/04
[52] U.S. Cl. ...................................................... 49/502
[58] Field of Search ................. 411/546, 371; 49/502, 49/381; 296/146 G, 146 B

[56] References Cited

U.S. PATENT DOCUMENTS

| 3,967,431 | 7/1976 | Jones | 411/371 |
| 4,955,659 | 9/1990 | Kosugi | 49/502 X |
| 5,040,334 | 8/1991 | Dossin et al. | 49/502 |

FOREIGN PATENT DOCUMENTS

| 0304769 | 3/1989 | European Pat. Off. |  |
| 2257449 | 8/1975 | France | 49/502 |

Primary Examiner—Peter M. Cuomo
Assistant Examiner—Jerry Redman
Attorney, Agent, or Firm—Cushman, Darby & Cushman

[57] ABSTRACT

A hinged body assembly for a motor vehicle, in which a backing-frame carrying a cover panel is fixed by bolts to a frame provided with bosses. The bosses, constructed of an easily trimmed and drilled material, allow optimum adjustment of the backing-frame with its fitted cover panel, relative to already assembled vehicle parts before the backing-frame/cover panel subassembly is finally mounted to the frame.

5 Claims, 2 Drawing Sheets

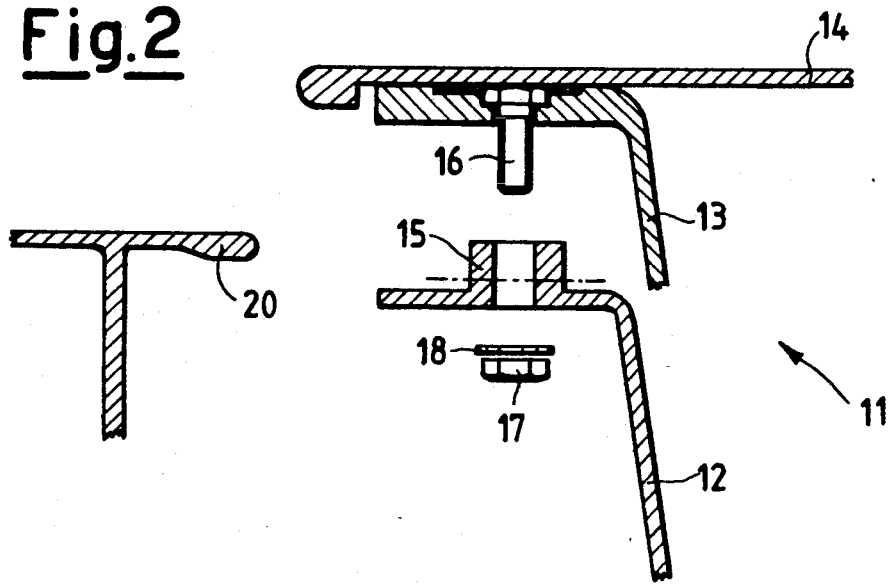
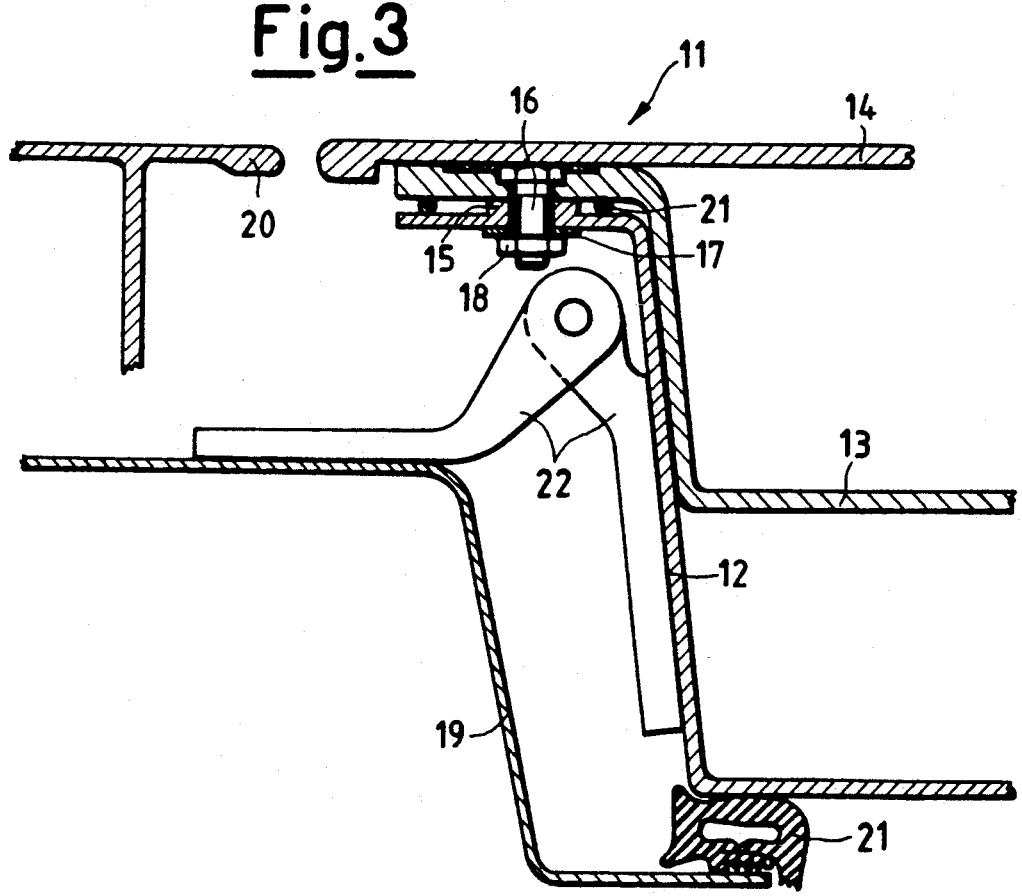

MOTOR VEHICLE BODY HAVING HINGED BODY PANEL ASSEMBLY INCLUDING ELEMENTS DESIGNED FOR MODIFICATION DURING INSTALLATION OF ASSEMBLY ON BODY, FOR ACHIEVING DESIRED FIT

BACKGROUND OF THE DISCLOSURE

This invention relates to hinged body elements for motor vehicles one of which is modified as the elements are assembled.

In particular, the invention relates to assemblies hinged to a vehicle body, such as hoods or doors. A known problem arises in respecting tolerances during the fitting of hinged assemblies to a vehicle body, as these are mounted when vehicle assembly is already at an advanced stage.

In this respect, the position of a door or hood on the vehicle conventionally can only be adjusted to the extent of the adjustment which can be made at the hinged and locks, and in the current state of the art, it is also difficult to check the internal component arrangement within door or hood assemblies.

SUMMARY OF THE INVENTION

The object of the present invention is to overcome the drawbacks of known hinged elements, and allow assembling of the elements to one another to be comfortably managed on an assembly line.

This object is attained by hinged an assembly comprising a frame to which a backing-frame that is rigidly sub-assembled together with an external cover element, can be securely fixed. The frame is provided with reinforcement means. The frame is provided with a plurality of bosses which are made of easily trimmed and drilled material and with which fixing means provided on the backing-frame engage for mounting the backing-frame/cover panel sub-assembly, to the frame element that is hinged to the vehicle body.

The frame can made be of plastics or metal construction.

In one embodiment of the present invention, the cover element is bonded to the backing-frame, and the fixing means provided on the backing-framer are bolts positioned between the cover element and backing-frame and fixable to the bosses, once drilled, by respective nuts.

The reinforcement means for the backing-frame is an anti-yielding crossmember which is positioned horizontally between the uprights of the backing-frame.

BRIEF DESCRIPTION OF THE DRAWINGS

The structural and operational characteristics and advantages of the hinged body elements according to the present invention will be more apparent from the description given hereinafter by way of non-limiting example with reference to the accompanying schematic drawings, in which:

FIG. 2 is a plan view of a detail of the backing-frame/cover panel sub-assembly, frame, and vehicle body according to the invention before the final assembly; and FIG. 3 is a plan view of an assembly according to the invention mounted on a vehicle, of which some details are schematically indicated.

DETAILED DESCRIPTION

Figure 1:
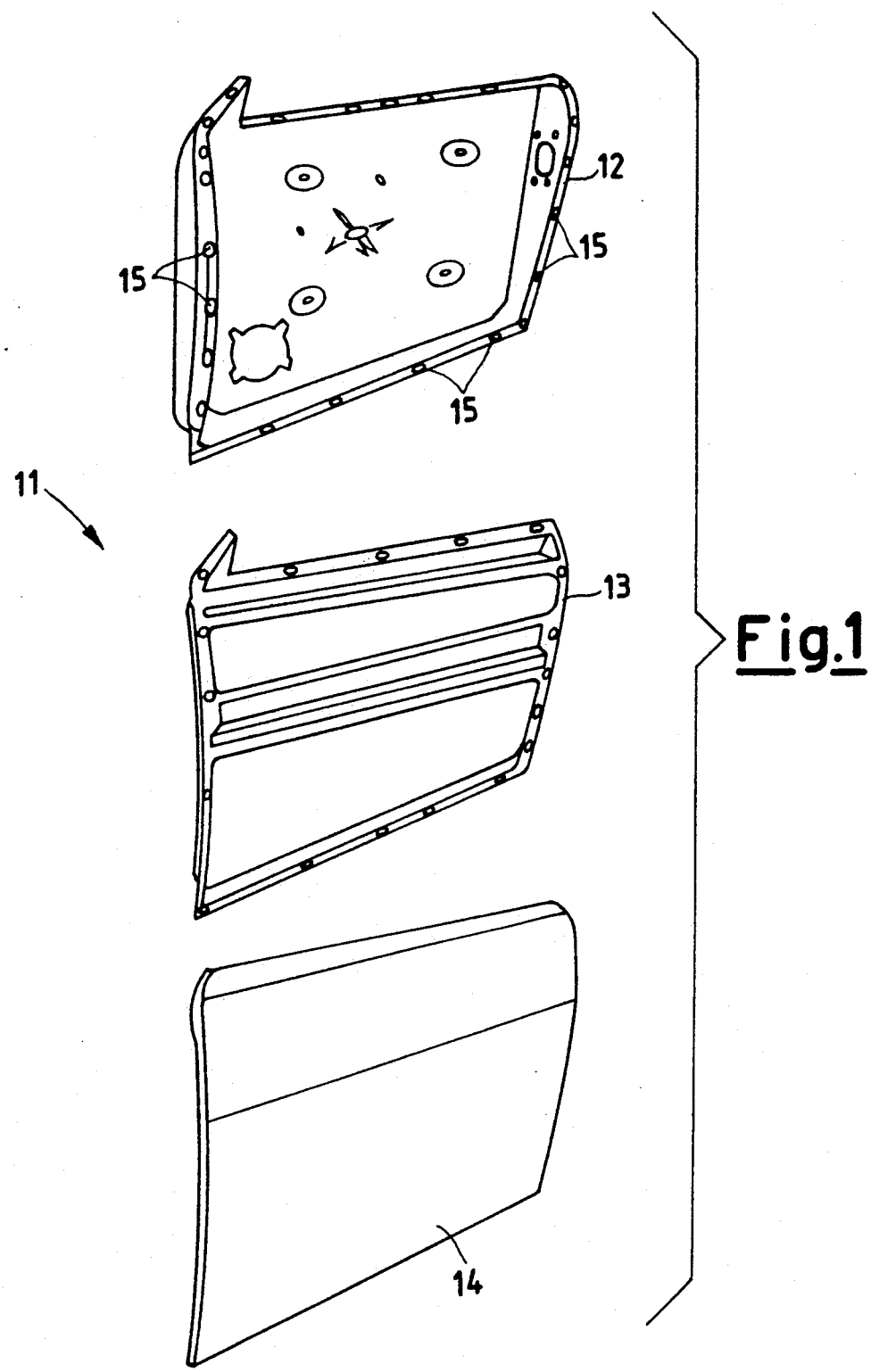
FIG. 1 is an exploded perspective view of hinged elements which, in use, are assembled to one another and to a vehicle body, according to the invention.

In the drawing Figures, the reference numeral 11 indicates overall a hinged element assembly according to the invention including a frame 12 to which a backing-frame 13 rigidly sub-assembled in advance to an external cover element 14, is securely fixed. Attachment of the backing-frame 13 to the cover element 14 provided a backing-frame/cover element sub-assembly.

The hinged assemblies according to the invention include doors or door assemblies, hoods and generally all assemblies of elements which can be hinged to a vehicle.

The frame 12 comprises a plurality of raised bosses 15 which are able to be drilled to receive a respective plurality of bolts 16. Nuts 17 and respective washers 18 are used to complete the assembling of the backing-frame/cover panel sub-assembly 13, 14 to the frame 12, and therefore to the vehicle body to which the frame element 12 has been hingedly secured.

During the mounting stage, the bolts 16 are inserted into the backing-frame after which the external cover element 14 is fixed onto it.

The frame 12 is fixed to a vehicle body 19 by a hinge 12. Before the backing-frame and frame are finally tightened together, a machine tool operates in accordance with a preset program which evaluates the relative positions and thicknesses of the elements in question, comparing them with the set tolerances and with the positions of the already assembled vehicle body elements such as the body upright 19 and fender 20 to remove (i.e., trim away) portions of one or more (so that each such boss is thereby axially shortened) bosses and to drill generally axially into each other the bosses, regardless of whether it has been trimmed, the resulting bolt holes being custom-located, so that the backing-frame with its fitted cover element is aligned with the vehicle body elements as the sub-assembly 13, 14 is mounted to the frame 12. The holes are thus drilled through the bosses at suitable points and in suitable directions, and in the same manner the required quantities of the material of which the bosses are made are removed from the bosses along suitable planes.

The backing-frame is then fixed to the frame.

This type of assembly ensures adequate tolerances at the doors and hoods against the contacting parts of seal gaskets 21.

Advantageously, using hinged elements according to the present invention all the components (not shown), which are intended to be located within the door or the can be mounted and checked from the outside before the assembly is mounted to the vehicle.

We claim:

1. A set of elements for a motor vehicle body panel assembly, for assembly to one another and hinged mounting to a motor vehicle body for hingedly closing a vehicle body opening having a perimeter of body material which has an ascertainable spatial location relative to a hinge location for mounting the assembly to the motor vehicle body;

said set of elements comprising:
a backing-frame having an external cover element rigidly mounted thereto, and thereby providing a backing-frame/cover element sub-assembly, said backing frame/cover element sub-assembly having a perimeter which is capable of being perimetrically surrounded in a substantially uniformly gapped, substantially flush disposition;

a plurality of fasteners protruding from said backing frame/cover element sub-assembly;

a frame including means for hingedly securing said frame to said motor vehicle body;

a plurality of bosses formed on said frame so as to be substantially axially alignable with said fasteners, at least some of said bosses being of such long axial extent as to prevent said substantially flush disposition from being achieved and thereby providing a uniform gap between said backing frame and said frame said substantially flush disposition of said perimeter of said backing frame/cover element sub-assembly relative to said frame; all of said bosses being made of drillable material, so that all of said bosses are available to be drilled to provide respective holes after said frame has been hingedly secured to said motor vehicle body, whereby said fasteners can be inserted into said holes in said bosses, for achieving said uniform-gap defined by said substantially flush dispositions.

2. The set of elements for a motor vehicle body panel assembly of claim 1, wherein:
said frame is made of molded plastic material.

3. The set of elements for a motor vehicle body panel assembly of claim 1, wherein:
said frame is made of metal.

4. The set of elements for a motor vehicle body panel assembly of claim 1, wherein:
said external cover element is rigidly mounted to said backing-frame by bonding.

5. The set of elements for a motor vehicle body panel assembly of claim 1, wherein:
said fasteners comprise bolts; and further including nuts threadable onto said bolts.

* * * * *